United States Patent
Wachtfogel et al.

(10) Patent No.: US 10,698,988 B2
(45) Date of Patent: Jun. 30, 2020

(54) DIFFERENCE ATTACK PROTECTION

(71) Applicant: Cisco Technology, Inc., San Jose, CA (US)

(72) Inventors: David Wachtfogel, Jerusalem (IL); Michal Devir, Haifa (IL); Harel Cain, Jerusalem (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 160 days.

(21) Appl. No.: 15/473,648

(22) Filed: Mar. 30, 2017

(65) Prior Publication Data

US 2018/0285537 A1 Oct. 4, 2018

(51) Int. Cl.
*G06F 21/16* (2013.01)
*H04N 21/83* (2011.01)
(Continued)

(52) U.S. Cl.
CPC .............. *G06F 21/16* (2013.01); *G06T 1/005* (2013.01); *H04N 5/913* (2013.01);
(Continued)

(58) Field of Classification Search
CPC .. G06F 21/16; G06F 2221/0737; G06F 3/016; G06F 2221/07; H04N 19/44; H04N 5/913; H04N 21/4405; H04N 21/8358; H04N 2005/91335; H04N 2005/91357; H04N 21/44008; H04N 2005/91; H04N 21/83; H04N 19/14; G06T 1/0021; G06T 2201/0051; G06T 1/00; G06T 2201/00; G06T 1/005; G06T 1/0028; G06K 9/0061; H04L 9/0858; H04L 27/2602
(Continued)

(56) References Cited

U.S. PATENT DOCUMENTS 4,876,509 A * 10/1989 Perlmutter ............. G01R 33/56
324/309
6,101,602 A 8/2000 Fridrich
(Continued)

FOREIGN PATENT DOCUMENTS

AU 2005202688 3/2006
CN 104658541 A * 5/2015
WO 2009131424 10/2009

OTHER PUBLICATIONS

Priyanka Premnath—"A review paper on forensic watermarking" International Journal of Research in Advent Technology http://www.ijrat.org, pp. 7 vol. 1, Issue 5, Dec. 2013 (Year: 2013)*
(Continued)

*Primary Examiner* — Jeffrey C Pwu
*Assistant Examiner* — Ali H. Cheema
(74) *Attorney, Agent, or Firm* — Merchant & Gould P.C.

(57) ABSTRACT

In one embodiment, a method for preventing a difference attack on watermarked video content is implemented on at least one computing device and includes: manipulating values of a set of pixels to embed a forensic watermark in at least one video frame in a video content item, where the manipulating is in accordance with a given magnitude of change in the values, and introducing random noise to the at least one video frame, where the random noise is random noise of the given magnitude.

18 Claims, 5 Drawing Sheets

(51) Int. Cl.
*H04N 21/4405* (2011.01)
*H04N 5/913* (2006.01)
*H04N 19/44* (2014.01)
*G06T 1/00* (2006.01)
*H04N 21/8358* (2011.01)
*H04N 21/233* (2011.01)
*H04N 19/14* (2014.01)
*H04N 21/44* (2011.01)
*H04N 9/64* (2006.01)

(52) U.S. Cl.
CPC ..... *H04N 21/4405* (2013.01); *H04N 21/8358* (2013.01); *G06F 2221/0737* (2013.01); *G06T 2201/0051* (2013.01); *G06T 2201/0063* (2013.01); *H04N 9/646* (2013.01); *H04N 19/14* (2014.11); *H04N 19/44* (2014.11); *H04N 21/233* (2013.01); *H04N 21/44008* (2013.01); *H04N 2005/91335* (2013.01); *H04N 2005/91357* (2013.01)

(58) Field of Classification Search
USPC ........... 726/22; 713/176; 382/100, 117, 284; 380/205, 252
See application file for complete search history.

(56) References Cited

U.S. PATENT DOCUMENTS

| | | | | |
|---|---|---|---|---|
| 6,141,441 | A * | 10/2000 | Cass | G06T 1/0028 235/494 |
| 6,845,170 | B2 * | 1/2005 | Wendt | G06T 1/0071 348/460 |
| 7,046,808 | B1 * | 5/2006 | Metois | G06T 1/0028 380/252 |
| 7,392,394 | B2 | 6/2008 | Levy | |
| 8,127,138 | B1 * | 2/2012 | Lynch | G01S 7/52001 367/100 |
| 9,349,153 | B2 | 5/2016 | Reed | |
| 2002/0150247 | A1 * | 10/2002 | Linnartz | G06T 1/0021 380/205 |
| 2003/0227867 | A1 * | 12/2003 | Xiong | H04L 27/2602 370/210 |
| 2006/0183275 | A1 * | 8/2006 | Schoner | G06T 5/002 438/166 |
| 2008/0089552 | A1 * | 4/2008 | Nakamura | G06T 1/0085 382/100 |
| 2009/0049304 | A1 * | 2/2009 | Muratani | G06T 1/005 713/176 |
| 2011/0194738 | A1 * | 8/2011 | Choi | G06K 9/0061 382/117 |
| 2012/0206657 | A1 * | 8/2012 | Bratt | H04N 9/646 348/708 |
| 2013/0156095 | A1 * | 6/2013 | Li | H04N 21/233 375/240.02 |
| 2013/0301740 | A1 * | 11/2013 | Guo | H04N 19/14 375/240.26 |
| 2014/0205204 | A1 * | 7/2014 | Jiang | G06T 5/50 382/284 |
| 2014/0270338 | A1 * | 9/2014 | Zhao | G06T 1/0021 382/100 |
| 2016/0301987 | A1 * | 10/2016 | Eyer | H04N 21/44008 |
| 2017/0140220 | A1 * | 5/2017 | Cogranne | G06K 9/00577 |
| 2018/0164887 | A1 * | 6/2018 | Wu | G06F 3/016 |
| 2018/0278425 | A1 * | 9/2018 | Xu | H04L 9/0858 |

OTHER PUBLICATIONS

Jidong Zhong—"Watermarking Embedding and Detection" IEEE—Electronic, Information and Electric Engineering zhongjidong@sjtu.org First Version was finished at Sep. 2006 and final version at May 2007. (Year: 2006).*
A Review Paper on Forensic Watermarking—Priyanka Premnath International Journal of Research in Advent Technology vol. 1, Issue 5, Dec. 2013 (Year: 2013).*
Watermark Embedding and Detection—Jidong Zhong IEEE—Electronic, Information and Electric Engineering First Version was finished at Sep. 2006 and Final Version at May 2007 (Year: 2006).*
A Review Paper on Forensic Watermarking by Priyanka Premnath vol. 1, Issue 5, Dec. 2013 pp. 7 (Year: 2013).*
A New Robust Watermarking Scheme for Color Image in Spatial Domain Ibrahim Nasir, Ying Weng, Jianmin Jiang School of Informatics, University of Bradford, UK pp. 6 (Year: 2007).*
A guide tour of video watermarking by Gwena.el Do.err, Jean-Luc Dugelay Signal Processing: Image Communication pp. 20 (Year: 2003).*
Robust Hash Functions for Digital Watermarking by Jiri Fridrich and Miroslav Goljan Center for Intelligent Systems, SUNY Binghamton, Binghamton, NY pp. 6 (Year: 2002).*
DigitalWatermarking facing Attacks by Amplitude Scaling and Additive White Noise by Joachim J. Eggers 4th Intl. ITG Conference on Source and Channel Coding; Berlin, Jan. 28-30, 2002 pp. 8; (Year: 2002).*
Using noise inconsistencies for blind image forensics by Babak Mandian, Stanislav Saic Image and Vision Computing 27 (2009) 1497-1503; Received Oct. 3, 2007 pp. 7; (Year: 2007).*
Secure Spread Spectrum Watermarking for Multimedia by Ingemar J. Cox, Joe Kilian, F. Thomson Leighton, and Talal Shamoon IEEE Transactions on Image Processing, vol. 6, No. 12, Dec. 1997 pp. 15; (Year: 1997).*
Cox, Ingernar G. et al.; Digital Watermarking and Steganography; 2nd edition, Elsevier, 2008, p. 112.

* cited by examiner

DIFFERENCE ATTACK PROTECTION

FIELD OF THE DISCLOSURE

The present invention generally relates to protecting video content from difference attacks to circumvent digital watermarks.

BACKGROUND OF THE INVENTION

Forensic watermarking for the identification of specific versions of video content is known in the art. A forensic watermark, also called a digital watermark, is a sequence of characters or code embedded in a document, image, video or computer program to uniquely identify its originator and/or authorized user. Forensic watermarks are typically embedded in video content by employing an algorithm to manipulate a number of pixels in one or more video frames in such a manner that the forensic watermark does not materially affect that viewing experience; typically a viewer is incapable of discerning the existence of the forensic watermark while viewing the video content. A complementary algorithm may be used to extract the forensic watermark from the video content item. In such manner, forensic watermarks may be used to determine a source for illegally distributed video content.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for preventing a difference attack on watermarked video content is implemented on at least one computing device and includes: manipulating values of a set of pixels to embed a forensic watermark in at least one video frame in a video content item, where the manipulating is in accordance with a given magnitude of change in the values, and introducing random noise of the given magnitude to the at least one video frame.

Description

Video pirates, i.e., non-licensed distributers of video content, are known to use various methods to circumvent forensic watermarks. One such method is a "difference attack"; a form of collusion attack performed by two or more colluding entities in possession of legally obtained copies of a video content item. It will be appreciated that each of the legally obtained copies may include one or more instances of a particular forensic watermark according to which the original licensee of the associated copy may be identified. In a difference attack, the colluders calculate the per-pixel difference between time synchronized video frames from the copies at their disposal, and black out (or otherwise obfuscate, or replace) all differing pixels to render a non-watermarked copy of a video content item per the common pixels in two or more watermarked copies of the video content item with different forensic watermarks.

It will be appreciated that the locations of the non-common pixels, i.e., the differing pixels, are presumed to be the forensic watermarks intended to protect the original, licensed copies. The resulting, non-watermarked video content item may therefore not be traceable via the forensic watermarks originally embedded in the licensed copies that were legally obtained by the colluding entities.

It will be appreciated that in a non-watermarked video content item rendered via difference attack there may be slight imperfections in the video frames where the forensic watermarks had been in the original watermarked copies. However, such imperfections are typically small enough that even if visible to the naked eye they may not materially impact the viewing experience, particularly if the video content item is from a live content item. A viewer may be willing to suffer some degradation in video quality in exchange for the opportunity to view the video content item without delay.

In accordance with embodiments described herein, such collusion attacks may be frustrated by introducing random pixel variations into a video content item's video frames, thereby substantially increasing the ratio of non-identical to identical pixels when comparing watermarked copies in a difference attack. The random noise caused by such pixel variations may serve to obscure the actual location of a forensic watermark. It will be appreciated that if a sufficiently large percentage of the pixels in a video frame have been altered in a difference attack, the resulting non-watermarked copy of the video content item may be rendered unusable.

Figure 1A:
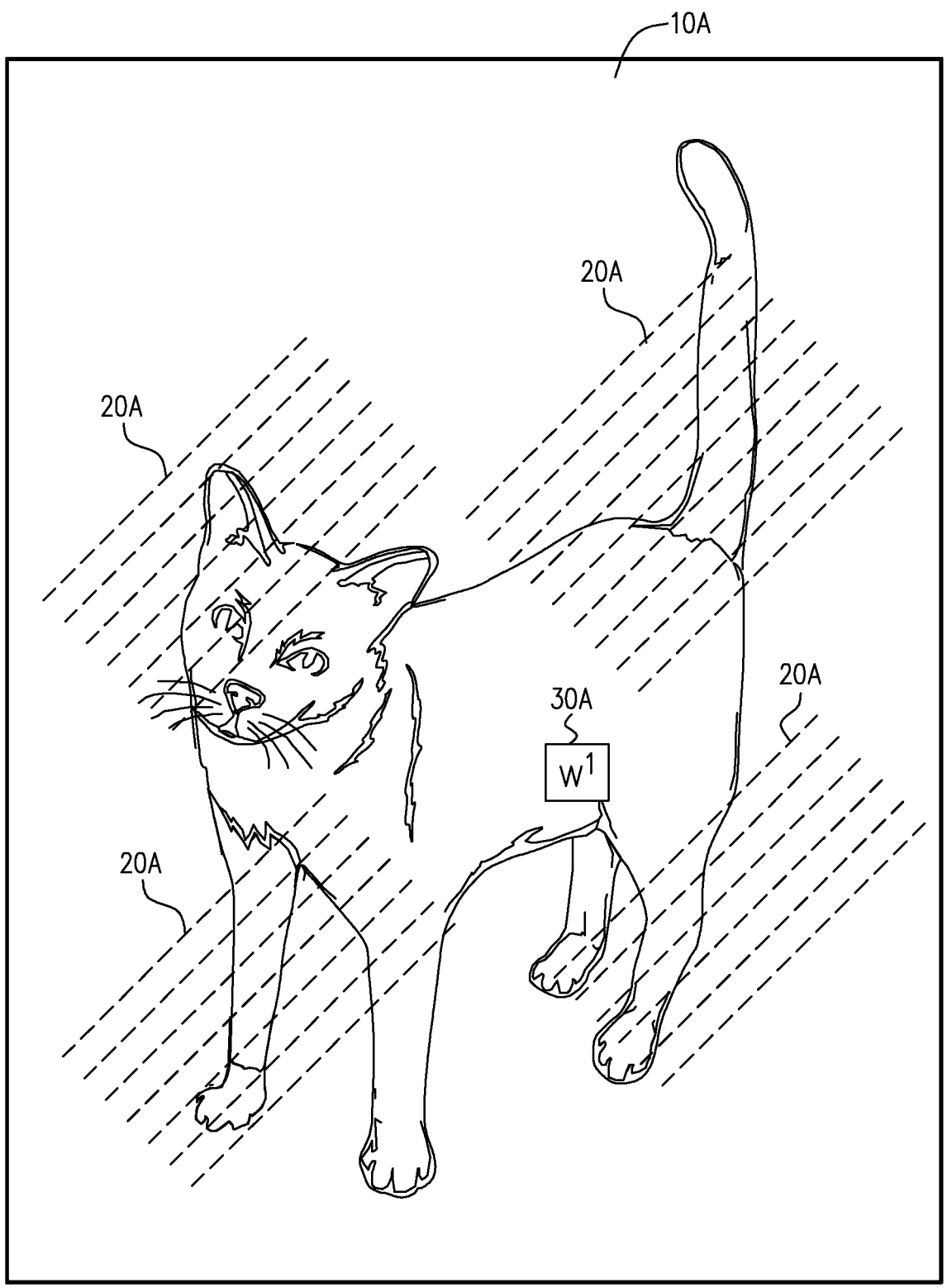
FIGS. 1A and 1B are a pictorial illustrations of exemplary video images with embedded forensic watermarks and random noise in accordance with embodiments described herein.
Figure 1B:
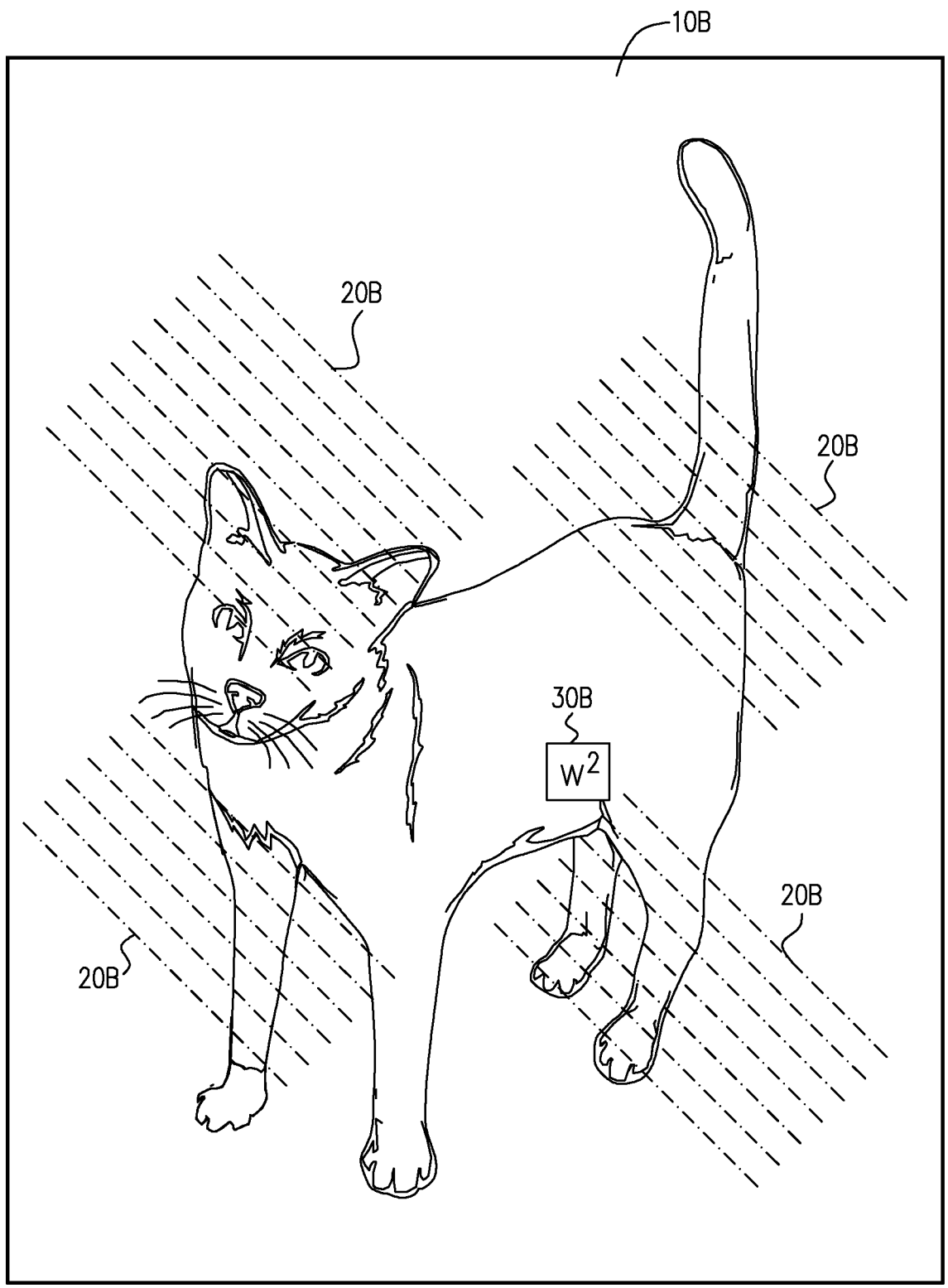

Reference is now made to FIGS. 1A and 1B which respectively depict exemplary video frames 10A and 10B. Video frames 10A and 10B represent time synchronized versions of a video frame from a video content item that was provided to two different licensees. Accordingly, video frame 10A comprises forensic watermark 30A, i.e., "$W^1$", whereas video frame 10A comprises forensic watermark 30B, i.e., "$W^2$".

It will be appreciated that forensic watermarks 30 may be generated and embedded in video frames 10 by any suitable means known in the art. For example, a unique subscriber identifier may be associated with a video content rendering device (e.g., a set-top box, a personal computer, a smart-television, a smartphone, etc.), and algorithmically manipulated to generate and embed forensic watermarks 30 in video frames 10. It will be appreciated that the variance in pixels represented by forensic watermarks 30A and 30B may be of low intensity, such that persons viewing the video content item may not detect them within the presented image of a cat.

Video frame 10A also comprises random noise 20A, and video frame 10B also comprises random noise 20B. Random noise 20A and 20B represent random slight variations in the pixels of some, or all, of their respective video frames 10. Such random slight variations may be introduced as a function of randomizing elements such as are known in the art. It will be appreciated that the depiction of random noise 20A and 20B as having defined geometric shapes comprised of parallel dashed lines is made for convenience of illustration. In operation, random noise 20 may be distributed throughout video frames 10 in a generally random manner, and may comprise pixel variations in some or all of the pixels in the area indicated by random noise 20.

It will be appreciated that the variance in pixels represented by forensic watermarks 30A and 30B may be of low intensity, below a viewing threshold, such that viewers may not notice any differences between video frames 10A and 10B; both video frames 10 may appear to depict the same image, i.e., a cat. Accordingly, the addition of random noise 20 to a given video frame 10 in a given video content item may not materially affect a viewing experience for the given video content item.

Figure 1C:
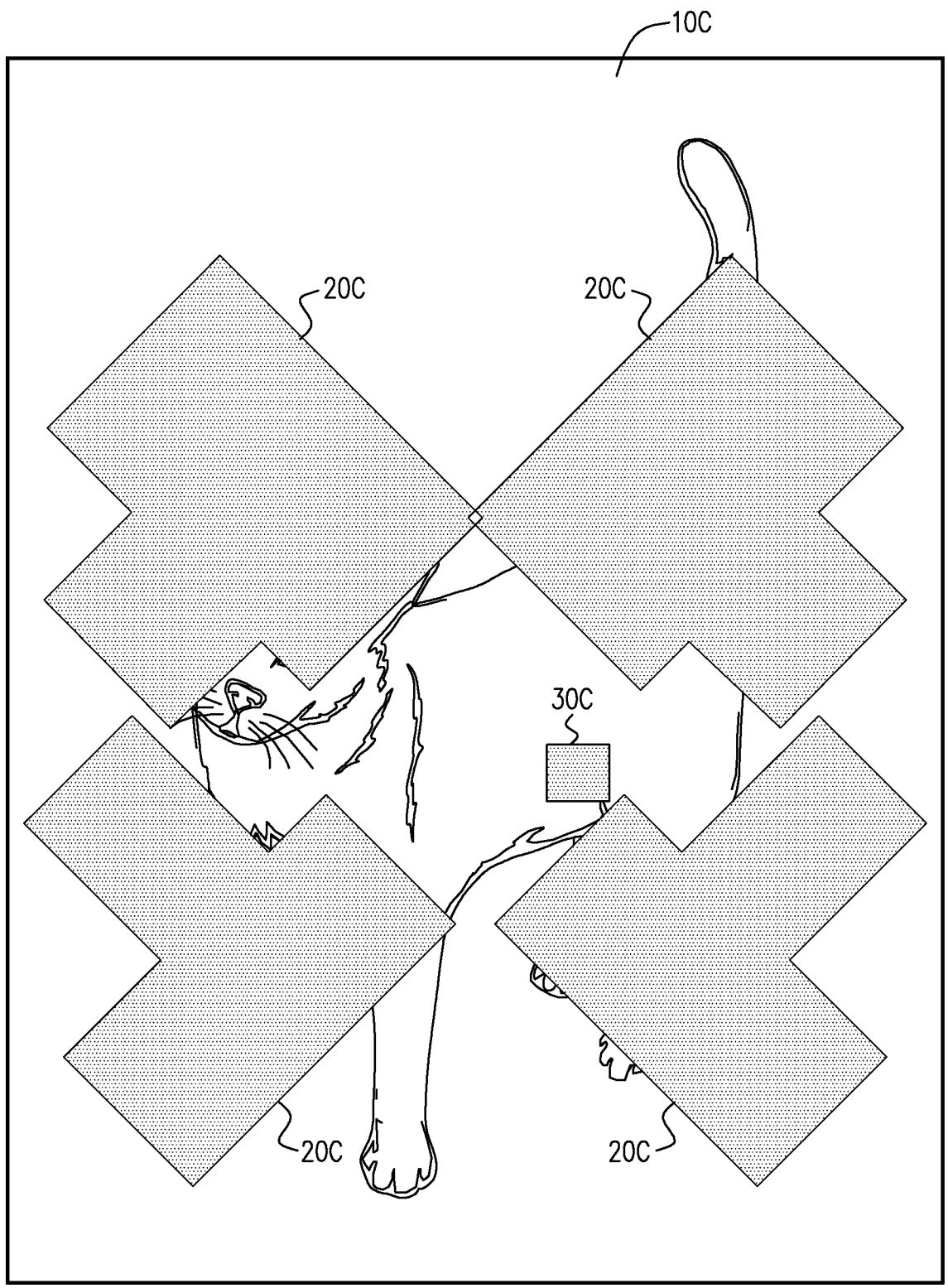
FIG. 1C is a pictorial illustration of an exemplary result from a collusion attack using video images of FIGS. 1A and 1B.

Reference is now made to FIG. 1C which represents video frame 10C, an exemplary result from a difference attack using video frames 10A and 10B. As depicted, watermark location 30C has been greyed out due to the non-common pixels of watermarks 30A and 30B. Similarly, the areas indicated by either random noise 20A or random noise 20B (collectively referred to hereinafter as "random noise 20") in FIGS. 10A and 10B are shown as greyed out areas 10C, thereby obscuring the underlying image of the cat that was visible in video frames 10A and 10B. It will be appreciated that the embodiments described herein may support different locations for random noise 20 and/or the obscuring of larger or smaller portions of the underlying image. For example; random noise 20A and 20B may be alternatively be focused at the center of video frames 10A and 10B, or may cover the entirety of video frames 10A and 10B. The exemplary embodiment of FIGS. 1A-1C may be presented to provide context for grey out area 20C, i.e., illustrating the effect of random noise 20A and 20B on the underlying image of a cat. In operation, the grey out area 20C may obscure more, less, or even all of the underlying image.

Figure 2:
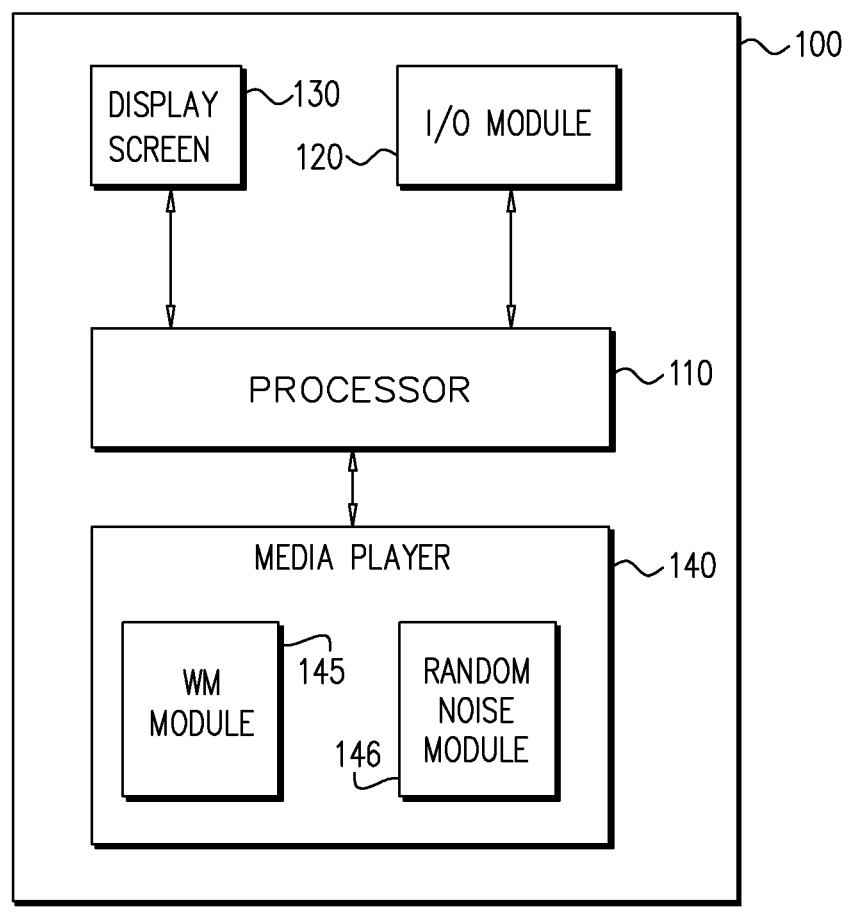
FIG. 2 is a schematic illustration of a video rendering device, constructed and operative to render the video images of FIGS. 1A and 1B.

Reference is now made to FIG. 2, which illustrates a schematic illustration of an exemplary video rendering device 100, constructed and operative to render video images 10 in accordance with embodiments described herein. Video rendering device 100 may be any suitable rendering device for receiving and/or viewing video content that may support the insertion of baseband overlay images using alpha-blending before final output of the rendered content. For example, video rendering device 100 may be implemented in a suitably configured set-top box, a personal computer, a computer tablet, a smart-television, a smartphone, etc.

Video rendering device 100 comprises hardware and software components, such as are well-known in the art. Video rendering device 100 also comprises processor 110, I/O module 120, display screen 130 and media player 140. It will be appreciated that video rendering device 100 may comprise more than one processor 110. For example, one such processor 110 may be a special purpose processor operative to at least execute media player 140 to render and play a video content item. Processor 110 may be operative to execute instructions stored in a memory (not shown). I/O module 120 may be any suitable software or hardware component such as a universal serial bus (USB) port, disk reader, modem or transceiver that may be operative to use protocols such as are known in the art to receive video content from a video content supplier. Display screen 130 may implemented as an integrated or peripheral component, and may be operative to at least provide a visual display of video content rendered by media player 140.

Media player 140 may be an application implemented in hardware or software that may be executed by processor 110 in order to at least perform a method (described hereinbelow) to invoke watermark module 145 and random noise module 146 to embed forensic watermarks 30 and random noise 20 (FIGS. 1A and 1B) in video content. Alternatively, media player 140 may be implemented as a hardware component. It will be appreciated that media payer 140 may also comprise additional functionalities for the playing of video content.

Figure 3:
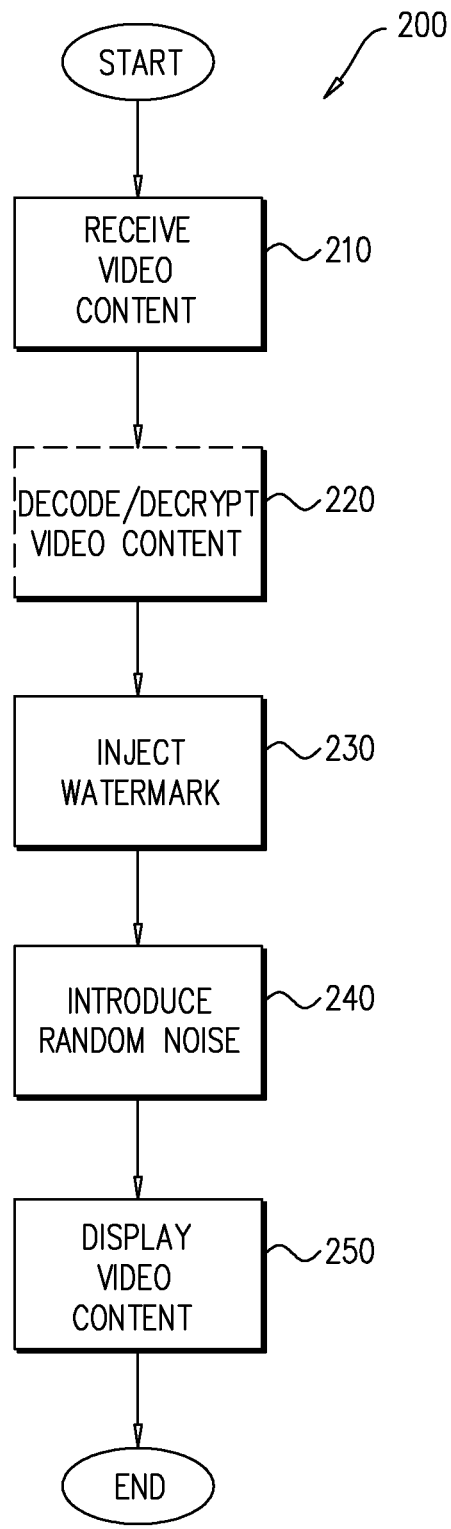
FIG. 3 is a flow chart of a video rendering process to be performed by the rendering device of FIG. 2.

Reference is now also made to FIG. 3 which illustrates a flow chart of a video rendering process 200 to be performed by media player 140 (FIG. 2), constructed and operative in accordance with embodiments described herein. Media player 140 may receive (step 210) a video content item to play. For example, the video content item may be streamed or downloaded to I/O module 120 from a video content supplier (e.g., a broadcast headend or an online video content provider) using satellite or cable transmission, a broadband connection, WiFi, removable media, etc.

It will be appreciated that the video content item may be received either encrypted and/or encoded. Accordingly, media player 140 may decode/decrypt (step 220) the received video content item before continuing with process 200.

Media player 140 may invoke watermark module 145 to embed (step 230) forensic watermark 30 (FIGS. 1A and 1B) into the video content item. It will be appreciated that any suitable algorithm (e.g., as disclosed in U.S. Pat. No. 9,208, 534 which is assigned to the common assignees of the present disclosure) for generating and embedding a forensic watermark into video content may be used by watermark module 145. For example, watermark module 145 may use a hardware or software based subscriber-specific identification number as a seed for generating forensic watermark 30. It will also be appreciated that watermark module 145 may embed the generated forensic watermark in multiple video frames in a given video content item, such that forensic watermark 30 may be embedded in some, or all, of video frames 10 (FIGS. 1A and 1B) in the given video content item. Watermark module 145 may also be configured to vary the location of forensic watermark 30 within the different video frames 10 of the video content item.

It will be appreciated that the embodiments described herein are not limited to the implementation of watermark module 145 as an integrated component of media player 140. For example, the functionality of watermark module 145 may alternatively be implemented for operation by a video content provider, e.g., as a component in a broadcast headend, removable media production system, etc. Alternatively, or in addition, the functionality of watermark module 145 may be implemented in a different module on video rendering device 100, for example, as part of a recording or licensing module invoked when storing video content for play at a later time. In such cases, forensic watermark 30 may be embedded in the video content item before step 210.

It will also be appreciated that the embodiments described herein may not be limited to the performance of the steps of process 200 in the order presented in FIG. 3. For example, in operation step 230 may not be contingent on the prior performance of step 220; watermark module 145 may also be operative to embed forensic watermark 30 in the encoded and/or encrypted versions of the received content item. Step 220 may then be performed after forensic watermark 30 is embedded in the received content item.

Media player 140 may invoke random noise module 146 to introduce random noise 20 (FIGS. 1A and 1B) into video frames 10. Random noise module 146 may employ any suitable method for introducing random noise into video frames 10. For example, random noise module 146 may generate normally distributed noise using independent and identically distributed (I.I.D.) random variables for all the pixels in a target range (i.e., either some or all of a video frame 10), then smoothing the results in the spatial domain using a Gaussian filter. It will however be appreciated that other distributions of noise and/or other smoothing filters may also be used. It will also be appreciated that the area covered by random noise 20 in a given video frame 10 may generally be large enough such that a difference attack may produce a video with little or no viewing value.

It will be appreciated that random noise module 146 may be configured to generate random noise 20 with a maximum pixel deviation vis-à-vis the original video content item in order to render the random noise imperceptible to the casual observer, thereby preventing a negative impact on the perceived video quality of the video content item when viewed by a licensed user. It will also be appreciated that the magnitude of the noise introduced by random noise module 146 as random noise 20 may be similar to that of forensic watermark 30 in order to prevent filtering out random noise 20 and exposing forensic watermark 30 to a difference attack as described hereinabove.

It will also be appreciated that the introduction of random noise 20 may not interfere with the extraction of watermark 30. For example, the embodiments described herein support the use of two different additive white Gaussian noise (AWGN) masks of the same magnitude; one AWGN mask may serve as a reference mark for random noise 20, and a second AWGN mask may serve as a reference mask for forensic watermark 30. The specific magnitude implemented may be a function of at least the invisibility desired (i.e., neither random noise 20, nor watermark 30 should be visible to a viewer of the video content) and the desired robustness of watermark 30 (i.e., the extent to which it would be detectable given further downstream processing). The two AWGN masks may be practically orthogonal and may not interfere with each other, as the detection of the forensic watermark reference mark is performed using linear correlation (dot product). It will be appreciated by one of ordinary skill in the art that as per the principle of "code division multiplexing", several uncorrelated reference marks embedded in the same work may have no effect on one another in a linear correlation system.

It will also be appreciated that the embedding of forensic watermark 30 (i.e., step 230) and the introduction of random noise (i.e., step 240) may be performed independently of each other. For example, step 230 may be performed in the compressed domain prior decoding/decrypting (i.e., step 220), whereas step 240 may be performed in the uncompressed domain right before playback.

Media player 140 may then play the rendered video content item, including random noise 20 and forensic watermark 30. It will be appreciated that in the absence of a difference attack, random noise 20 and forensic watermark 30 may be imperceptible to a viewer of the video content item. It will also be appreciated that that the steps of process 200 may be performed iteratively. Subsets of associated video frames 10 may be received in step 210 (e.g., when the video content item is being streamed) and subsequently processed in steps 220-250.

It will be appreciated that the embodiments described herein may be particularly effective in preventing difference attacks where the video content item is live content, i.e., video content from an ongoing live event such as, for example, a sporting event, a political debate, an awards show, etc. The methods described herein may complicate or totally prevent a simple difference attack, thereby introducing processing expenses and/or delays that may render the act of piracy impractical for the pirate and/or unacceptable for an end viewer.

It will be appreciated that the term "embedded" is used throughout the present specification and claims, in all of its grammatical forms, to refer to any type of activity involving placing the watermark, or portions thereof, in the video stream. For example, "embedding the watermark", "embedded bit", "a watermark embedding device", and so forth.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
  encoded, but neither scrambled nor encrypted;
  compressed, but neither scrambled nor encrypted;
  scrambled or encrypted, but not encoded;
  scrambled or encrypted, but not compressed;
  encoded, and scrambled or encrypted; or
  compressed, and scrambled or encrypted.

Likewise, the terms "decoded" and "decompressed" on the one hand, and the terms "descrambled" and "decrypted" on the other hand, are used to refer to different and exclusive types of processing.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for preventing a difference attack on watermarked video content, the method comprising:
    manipulating values of a set of pixels to embed a forensic watermark in at least one video frame in a video content item, wherein manipulating the values of the set of pixels comprises manipulating the values of the set of pixels in accordance with a given magnitude of change in the values; and
    introducing random noise of the given magnitude to the video content item comprising the forensic watermark, wherein introducing the random noise comprises:
        generating a normally distributed noise using independent and identically distributed random variables for all pixels in one or more video frames of the video content item comprising the forensic watermark, and
        smoothening the normally distributed noise in a spatial domain, wherein a first additive white Gaussian noise (AWGN) mask serves as a reference mark for the random noise, and wherein a second AWGN mask serves as a reference mask for the forensic watermark, wherein the first AWGN mask and the second AWGN mask are of a same magnitude and wherein the first AWGN mask is orthogonal to the second AWGN mask.

2. The method according to claim 1, wherein introducing the random noise comprises introducing the random noise on a video content rendering device.

3. The method according to claim 1, wherein manipulating the values of the set of pixels comprises manipulating the values of the set of pixels on a video content rendering device.

4. The method according to claim 2, further comprising:
    receiving the video content item on the video content receiving device, wherein manipulating the values of the set of pixels comprises manipulating the values of the set of pixels prior to receiving the video content.

5. The method according to claim 2, wherein the video content rendering device is a set-top box.

6. The method according to claim 1, further comprising:
    deriving the video content item by performing at least one of the following: decoding an encoded video content item, and decrypting an encrypted video content item.

7. The method according to claim 6, wherein manipulating the values of the set of pixels comprises manipulating the values of the set of pixels is performed prior to deriving the video content item.

8. The method according to claim 6, wherein the introducing the random noise is performed after deriving the video content item.

9. The method according to claim 1, wherein the forensic watermark is uniquely associated with a licensee of the video content item.

10. The method according to claim 1, wherein the at least one video frame is at least two video frames.

11. The method according to claim 1, wherein the video content item is live content.

12. The method according to claim 1, wherein introducing the random noise comprises:
    introducing the random noise in obscuring areas of the one or more video frames, wherein subsequent blacking out of the obscuring areas in a pixel-based difference attack renders the one or more video frames unviewable.

13. The method according to claim 1, wherein introducing the random noise comprises:
    introducing the random noise to all pixels in the one or more video frames, wherein subsequent blacking out of the random noise in a pixel-based difference attack renders obscures the one or more video frames.

14. An apparatus comprising:
    a memory storage; and
    a processing unit coupled to the memory storage, wherein the processing unit is operative to:
        manipulate values of a set of pixels to embed a forensic watermark in at least one video frame in a video content item, wherein the processing unit being operative to manipulate the values of the set of pixels comprises the processing unit being operative to manipulate the values of the set of pixels in accordance with a given magnitude of change in the values;
        introduce random noise to the video content comprising the forensic watermark, wherein the random noise is below a viewing threshold, wherein the processing unit being operative to introduce the random noise comprises the processing unit being operative to:
            generate a normally distributed noise using independent and identically distributed random variables for all pixels in one or more video frames of the video content item comprising the forensic watermark, and
            smoothen the normally distributed noise in a spatial domain, wherein a first additive white Gaussian noise (AWGN) mask serves as a reference mark for the random noise, and wherein a second AWGN mask serves as a reference mask for the forensic watermark, wherein the first AWGN mask and the second AWGN mask are of a same magnitude and wherein the first AWGN mask is orthogonal to the second AWGN mask.

15. The apparatus according to claim 14, wherein the forensic watermark is of similar magnitude to the random noise.

16. The apparatus according to claim 14, wherein the processing unit is operative to introduce the random noise to decoded video content.

17. The apparatus according to claim 14, wherein the processing unit is operative to embed the forensic watermark in encoded video content.

18. A non-transitory computer-readable medium that stores a set of instructions which when executed perform a method executed by the set of instructions comprising:
   manipulating values of a set of pixels to embed a forensic watermark in at least one video frame in a video content item, wherein manipulating the values of the set of pixels comprises manipulating the values of the set of pixels in accordance with a given magnitude of change in the values; and
   introducing random noise to the video content item comprising the forensic watermark, wherein the random noise is of the given magnitude, wherein introducing the random noise comprises:
      generating a normally distributed noise using independent and identically distributed random variables for all pixels in one or more video frames of the video content item comprising the forensic watermark, and
      smoothening the normally distributed noise in a spatial domain, wherein a first additive white Gaussian noise (AWGN) mask serves as a reference mark for the random noise, and wherein a second AWGN mask serves as a reference mask for the forensic watermark, wherein the first AWGN mask and the second AWGN mask are of a same magnitude and wherein the first AWGN mask is orthogonal to the second AWGN mask.

\* \* \* \* \*